(12) United States Patent
Yang et al.

(10) Patent No.: US 7,598,903 B2
(45) Date of Patent: Oct. 6, 2009

(54) SENSOR FOR MEASURING DISTANCE AND METHOD FOR MEASURING DISTANCE USING THE SENSOR

(75) Inventors: Jongryul Yang, Gyeonggi-do (KR); Songcheol Hong, Daejeon (KR)

(73) Assignee: Korea Advanced Institute of Science and Technology, Daejeon (KR)

( * ) Notice: Subject to any disclaimer, the term of this patent is extended or adjusted under 35 U.S.C. 154(b) by 0 days.

(21) Appl. No.: 11/798,454

(22) Filed: May 14, 2007

(65) Prior Publication Data
US 2007/0273575 A1 Nov. 29, 2007

(30) Foreign Application Priority Data
May 23, 2006 (KR) ............... 10-2006-0046179

(51) Int. Cl.
*G01S 13/08* (2006.01)
*G01S 13/32* (2006.01)
*G01S 13/10* (2006.01)
*G01S 7/02* (2006.01)

(52) U.S. Cl. .............. 342/85; 342/118; 342/127; 342/134; 342/175; 342/195

(58) Field of Classification Search ............. 342/127, 342/85, 94, 109, 118, 175, 134, 145, 189, 342/195
See application file for complete search history.

(56) References Cited

U.S. PATENT DOCUMENTS

| | | | | |
|---|---|---|---|---|
| 4,104,583 A | 8/1978 | Engen | | |
| 5,036,327 A | * 7/1991 | Dannenberg | ......... | 342/201 |
| 6,037,895 A | * 3/2000 | Uehara | ......... | 342/70 |
| 6,587,072 B1 | * 7/2003 | Gresham et al. | ......... | 342/70 |
| 2006/0023571 A1 | 2/2006 | Uebo et al. | | |

FOREIGN PATENT DOCUMENTS

| | | |
|---|---|---|
| JP | A 64-86084 | 3/1989 |
| JP | A 2006-029858 | 2/2006 |

OTHER PUBLICATIONS

A microwave position sensor with submillimeter accuracy Stelzer, A.; Diskus, C.G.; Lubke, K.; Thim, H.W.; Microwave Theory and Techniques, IEEE Transactions on vol. 47, Issue 12, Dec. 1999 pp. 2621-2624.*
A new automobile radar based on the six-port phase/frequency discriminator Gutierrez Miguelez, C.; Huyart, B.; Bergeault, E.; Jallet, L.P.; Vehicular Technology, IEEE Transactions on vol. 49, Issue 4, Jul. 2000 pp. 1416-1423.*
A Calibration Method of a Range Finder With a Six-Port Network Jong-Ryul Yang; Dong-Wook Kim; Songcheol Hong; Microwave and Wireless Components Letters, IEEE vol. 17, Issue 7, Jul. 2007 pp. 549-551.*

* cited by examiner

*Primary Examiner*—Thomas H Tarcza
*Assistant Examiner*—Cassi Galt
(74) *Attorney, Agent, or Firm*—Oliff & Berridge, PLC

(57) ABSTRACT

A distance measurement sensor and a distance measurement method using the same are disclosed. The distance measurement sensor can use all of a pulse method and a Continuous Wave (CW) method, can select an appropriate measurement method according to the distance to be measured, thereby accurately measuring the distance. The distance measurement sensor solves the reception-signal limitation caused by a transmission leakage signal in the case of the CW method, reduces an amount of power consumption, measures distances of several objects at the same time, and establishes the range of the distance.

9 Claims, 6 Drawing Sheets

SENSOR FOR MEASURING DISTANCE AND METHOD FOR MEASURING DISTANCE USING THE SENSOR

BACKGROUND OF THE INVENTION

1. Field of the Invention

The present invention relates to a sensor for measuring a distance and a method for measuring the distance using the sensor, and more particularly to a sensor for measuring a distance using a high-frequency signal and a method for measuring the distance using the sensor.

2. Description of the Related Art

There are a variety of conventional methods for measuring a distance using a radar sensor. According to the types of transmitting/receiving signal, the conventional methods are classified into a method for employing a Continuous Wave (CW) signal, a method for employing a pulse, and a method for employing an impulse represented by an Ultra Wideband (UWB).

The distance measurement sensor for employing the CW signal transmits/receives continuous high-frequency signals, detects a phase difference of two high-frequency signals, such that it measures the distance using the detected phase difference. The above-mentioned distance measurement method based on the CW signal can manufacture a distance measurement sensor having a very low measurement error using a Frequency Modulated Continuous Wave (FMCW) method and a Frequency Stepped Continuous Wave (FSCW) method. However, the above-mentioned distance measurement method transmits or receives a high-frequency signal using the CW signal, such that the transmission signal and the reception signal are always transmitted at the same time.

If the transmission and the reception of the signal are executed over a single antenna, the above-mentioned method requires an isolator and a circulator for separating the transmission signal from the reception signal.

FIG. 1 is a schematic diagram illustrating a conventional radar transmission/reception end using a single antenna.

Referring to FIG. 1, the radar transmission/reception end includes a transmitter 103, an antenna 105, a receiver 104, and a signal separator 101.

The transmitter 103 is designed to transmit a high-frequency signal, and includes a power amplifier 1031, a coupler 1032, and a frequency generator 1033.

The signal separator 101 is designed to separate the transmission signal from the reception signal. For example, the circulator or isolator may be used as the signal separator 101. Due to characteristics of the transmission signal, some parts of the transmission signal leak to the reception signal. The reference number 102 denotes the leaking reception signal.

The receiver 104 is designed to receive the high-frequency signal, and includes a low-noise amplifier 1041, a mixer 1042 for comparing the high-frequency signal with a reference signal, and a low-pass filter (LPF) 1043 for removing the high-frequency signal. The output signal of the coupler 1032 contained in the transmitter 103 is used as the reference signal. However, generally, the isolator and the circulator are manufactured in the form of a large-sized product, such that it is impossible to integrate the isolator and the circulator, and it is difficult to separate the isolator and the circulator from each other.

In the meantime, the reason why the transmission end and the reception end use different antennas instead of a single antenna is to prevent leakage signals directly generated from the transmission/reception ends from being connected, such that the negative influence of the leakage signal can be greatly reduced.

Referring to FIG. 2, the radar transmission/reception end includes a transmitter 201 and a receiver 202.

The transmitter 201 is designed to transmit a high-frequency signal, includes a frequency generator 2014, a coupler 2013, a power amplifier 2012, and a transmission antenna 2011.

The receiver 202 is designed to receive the high-frequency signal, and includes a low-noise amplifier 2022, a mixer 2023 for comparing the high-frequency signal with the reference signal, a low pass filter (LPF) 2024 for removing the high-frequency signal, and a reception antenna 2021.

The above-mentioned conventional radar sensor employs a high-priced separation device for separating the transmission signal and the reception signal from each other, and transmits a high transmission power using an algorithm processed by a super computer and a large-sized antenna having superior directivity. Therefore, although the separation characteristics between the transmission end and the reception end are not greatly considered, there is no problem in operating the sensor.

However, in order to manufacture a very-small-sized radar sensor and apply the small-sized radar sensor to a variety of application fields, the conventional radar method is of no use.

Specifically, in the case of using two antennas, each of which determines its own size according to the frequency, a total size of the sensor increases, such that it is difficult to manufacture a very-small-sized sensor.

Also, the above-mentioned two antennas are connected to the integrated sensor, such that the first antenna and the second antenna are adjacent to each other, resulting in the coupling effect of the two antennas. Therefore, the leakage effect of the transmission signal occurs, such that it has a negative influence upon the reception end.

If the distance to be measured becomes longer such that the leakage signal is higher than the actually-received signal, the above-mentioned leakage signal encounters serious problems.

If the gain of the reception end increases to amplify a low signal, the leakage signal received from the transmission end is also amplified, such that it allows a signal processing end to be saturated, and it is impossible to receive the signal. Therefore, the actual distance capable of being actually measured is designed to be shorter than a maximum measurement distance determined by the sensor's specification, and the error of the actual measurement distance increases within the distance capable of being measured.

In this way, the negative influence caused by the transmission leakage signal in the very small-sized radar sensor based on the CW signal is inevitable.

Specifically, in the case of a direct-conversion radar sensor for including necessary information in a DC (Direct Current) signal, information caused by a DC offset encountered by the transmission leakage signal is distorted, resulting in a more serious problem.

The conventional radar sensor introduces a complicated algorithm to its reception signal, such that it reduces the leakage problem using a high-performance CPU (Central Processing Unit), or it minimizes the negative influence of the above-mentioned problem using an additional circuit. However, indeed, due to the limitation in the implementation principle, it is difficult to completely solve the above-mentioned problem.

Compared with the CW-based sensor, the influence of the transmission leakage signal is negligible in other sensors (i.e., the pulse-based sensor or the impulse-based sensor) because the pulse and the impulse are separated in time.

The pulse-based sensor and the impulse-based sensor are designed to measure the time from the transmission point to the reception point of the signal. According to the pulse-based sensor and the impulse-based sensor, the transmission end does not transmit the signal during the reception time, such that there is no transmission leakage caused by the transmission signal. However, if there is an overlapping part between the transmission signal and the reception signal, the sensor for recognizing the distance on the basis of a difference in time is unable to recognize the distance.

In other words, if the transmission signal and the reception signal are simultaneously received because the distance to be measured is short, the pulse-based sensor the impulse-based sensor cannot acquire the distance information, such that a minimum measurement distance must be limited.

Generally, the sensor for measuring the time using the pulse has difficulty in measuring the distance of less than 20 cm. In order to increase the accuracy and precision of the measurement, the pulse-based sensor and the impulse-based sensor must use a short pulse-width signal (i.e., a wide bandwidth signal) to the signal transmission/reception, such that the configuration of an overall sensor is complicated and it is difficult to design each circuit. Also, since the range of reducing the pulse width is limited, the measurement accuracy is lower than that of the CW-based sensor.

In the meantime, the 6-port structure using 6 ports has been proposed to substitute a Vector Network Analyzer (VNA) for precisely measuring a reflection coefficient in the 1970's.

FIG. 3 is a circuit diagram illustrating a 6-port structure denoted by passive elements.

Referring to FIG. 3, the 6-port circuit includes 2 input ports (a1 and a2) and 4 output ports (b1, b2, b3, and b4). The 4 output ports are represented by a linear relationship between a single reference signal (L0) received from the two input ports and another RF (Radio Frequency) signal.

The high-frequency signals of the four output ports (b1, b2, b3, and b4) can be converted into voltage signals via the power detector (See FIG. 6) and the LPF. If a mathematical calculation is applied to the voltage conversion using 4 output voltages, a reflection coefficient of the RF signal can be recognized.

The reference number 301 of FIG. 3 is indicative of a directional coupler for changing the phase by 90 or 180 degrees. The reference number 302 is indicative of a transmission line delayed by 90 degrees such that it can transmit the same phase signal in two ways. The reference number 303 is indicative of a resistor for removing the high-frequency signal. The above-mentioned 6-port circuit and a method for using the same have been disclosed in the U.S. Pat. No. 4,104,583, so that a detailed description thereof will herein be omitted for the convenience of description.

The above-mentioned conventional distance measurement sensor based on the 6-port structure must apply the high-frequency signal to two input ports at the same time, such that only the method for measuring the distance using the CW signal can be made available.

In conclusion, an improved remote-distance measurement sensor and an improved distance measurement method must be developed such that they can maintain the advantages of the CW-based measurement method without any change, and can solve the problems of the CW-based measurement method.

SUMMARY OF THE INVENTION

Therefore, the present invention has been made in view of the above problems, and it is an object of the present invention to provide a distance measurement sensor capable of being operated under a CW mode for continuously transmitting/receiving the CW signal and a pulse mode for transmitting the CW signal during only a specific time, and a method for measuring the distance at high precision.

It is another object of the present invention to provide a distance measurement sensor for removing a negative influence of the transmission leakage signal, transmitting/receiving the CW signal simultaneously while consuming a minimum amount of power, defining the range of the measurement distance, acquiring only information of only the object located within the corresponding distance, and separating individual object information pieces from each other when there are several objects to be measured, and a method for measuring the distance using the distance measurement sensor.

In accordance with one aspect of the present invention, the above and other objects can be accomplished by a distance measurement sensor comprising: a frequency-controllable oscillator for generating a reference signal and a transmission signal transmitted to a target object to be measured; an antenna for transmitting the generated signal and receiving the reception signal reflected from the target object to be measured; a power amplifier for amplifying the transmission signal; a low-noise amplifier for amplifying the reception signal; a first switch for controlling the power amplifier; a 6-port circuit for receiving the reference signal and the reception signal as its input signals, detecting a phase difference between the reference signal and the reception signal, and being able to obtain distance information denoted by power of a high-frequency signal on the basis of the detected phase difference; a second switch located between the frequency-controllable oscillator and the 6-port circuit, for controlling the reference signal; a high-frequency power detector for converting the high-frequency signal power into a DC voltage in four outputs of the 6 port circuit; an Analog-to-Digital Converter (ADC) for converting the DC voltage obtained by the high-frequency power detector into data capable of being calculated; and a Central Processing Unit (CPU) for controlling the frequency of the signal generated from the frequency-controllable oscillator and the first and second switches, calculating the output data of the ADC using an algorithm stored in the CPU itself as distance data, and displaying the distance data.

Preferably, the antenna is commonly used to transmit the generated signal and to receive the reception signal, and an input terminal of the antenna is connected to a directional coupler for separately receiving the transmission signal and the reception signal.

Preferably, the high-frequency power detector is configured in the form of a differential circuit equipped with 2 transistors, such that it can remove a DC offset voltage.

Preferably, a method for measuring a distance using the distance measurement sensor of claim 1 comprises: transmitting/receiving a CW (Continuous Wave) signal during a specific time, comparing a phase of the transmission signal with that of the reception signal, and measuring the distance according to the result of the comparison.

Preferably, a method for measuring a distance using the distance measurement sensor of claim 1 comprises: controlling a supply power of the power amplifier using the first switch, controlling a reference signal applied to a reference signal end to an input terminal of the 6-port circuit using the second switch, and implementing a pulse mode.

Preferably, the distance measurement sensor has different operation modes according to measurement distances.

Preferably, the sensor is operated under a CW mode for continuously transmitting/receiving a continuous wave (CW) signal within a short distance for satisfying an equation "$t_{(511)} - t_{(506)} < 0$"; and the sensor controls a continuous wave (CW) signal at a remote distance for satisfying an equation "$t_{(511)} - t_{(506)} > 0$", so that a transmission/reception operation is executed during only the specific time, wherein $t_{(511)}$ is indicative of a delay time of the distance between a reception signal, which is reflected from the target object and is then received in the sensor, and the target object to be measured, and $t_{(506)}$ is indicative of a specific time during which the first switch is switched on to operate the power amplifier.

Preferably, a switching ON time of the second switch is controlled so as to apply the reference signal to an input terminal of the 6-port circuit, so that the distance range of the object to be measured is determined and the signal is detected.

Preferably, the transmission/reception signals are controlled to distinguish several objects in real time, such that each signal is detected.

In brief, the distance measurement sensor according to the present invention compares a CW-frequency phase of a transmission signal with that of the reception signal in the same manner as in a remote radar sensor employing a distance measurement 6-port phase frequency discriminator. In addition, the distance measurement sensor further includes a specific structure capable of being operated at a high-frequency under the pulse mode, such that the above-mentioned distance measurement sensor is superior to the remote radar sensor.

If the distance to be measured is short, the distance measurement sensor continuously transmits/receives the CW signal to measure the distance. If the distance to be measured is long, the distance measurement sensor measures the distance using the pulse operation in which the CW signal is transmitted/received during only a predetermined time.

The detailed examples of the distance measurement method according to the present invention will hereinafter be described.

The remote distance measurement system using the 6-port phase frequency discriminator receives two high-frequency signals at the input terminal of the 6-port circuit, detects a difference in phase between the two high-frequency signals, and measures the distance on the basis of the detected phase difference.

In order to activate the remote distance measurement system, the remote distance measurement system must receive the reference signal and the reception signal reflected from the target object at the input terminal of the 6-port circuit, such that it is generally operated by the CW signal.

However, if the above-mentioned distance measurement system is operated by the CW signal, a DC offset occurs by a transmission leakage signal acquired when the transmission power amplified for signal transmission is applied to the reception end, such that the maximum measurement distance is limited.

If the gain of the amplifying end increases to amplify a received low-value signal, the amplifying end of the reception signal is saturated due to the leakage signal, resulting in deterioration of a system performance.

In order to solve the above-mentioned problems, if a short distance having a low influence caused by the transmission/reception leakage signal is measured, the distance measurement system is operated by the CW signal. Otherwise, if the distance to be measured becomes longer, the distance measurement system is operated by the pulse signal. For this purposes, the distance measurement system according to the present invention includes a first switch and a second switch.

The first switch is connected to a power-supply unit of the power amplifier, such that it controls the transmission signal. The second switch is located at a transmission line receiving the reference signal, allows the reference signal to enter the 6-port circuit, and controls operations of the phase frequency discriminator, The first switch is connected to the power-supply unit of the power amplifier during only a predetermined time, it transmits the high-frequency signal, and blocks the signal from being applied to the reference signal, such that the problem of the output signal is removed.

If the high-frequency signal returns to the reception end after being reflected from the target object, the switch connected to the reference signal is switched on, such that the reference signal and the reception signal are applied to the input terminal of the 6-port phase frequency. As a result, the distance measurement system detects a difference in phase between the reference signal and the reception signal, and recognizes distance and speed information of the target object.

If the distance measurement system is operated by the pulse signal, it can solve the problem caused by the transmission leakage signal, can simultaneously measure several objects, and can acquire information of only a specific object located at a specific distance, such that it can solve the problems of the conventional CW-based method.

Furthermore, the distance measurement system according to the present invention controls the power-supply unit of a power amplifier acting as an element for consuming the largest amount of power from among the sensor elements, such that it can reduce the amount of power consumption of the sensor, resulting in the implementation of Ubiquitous radar sensor system. As a result, the distance measurement system according to the present invention can also be applied to many more application fields.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Figure 1:
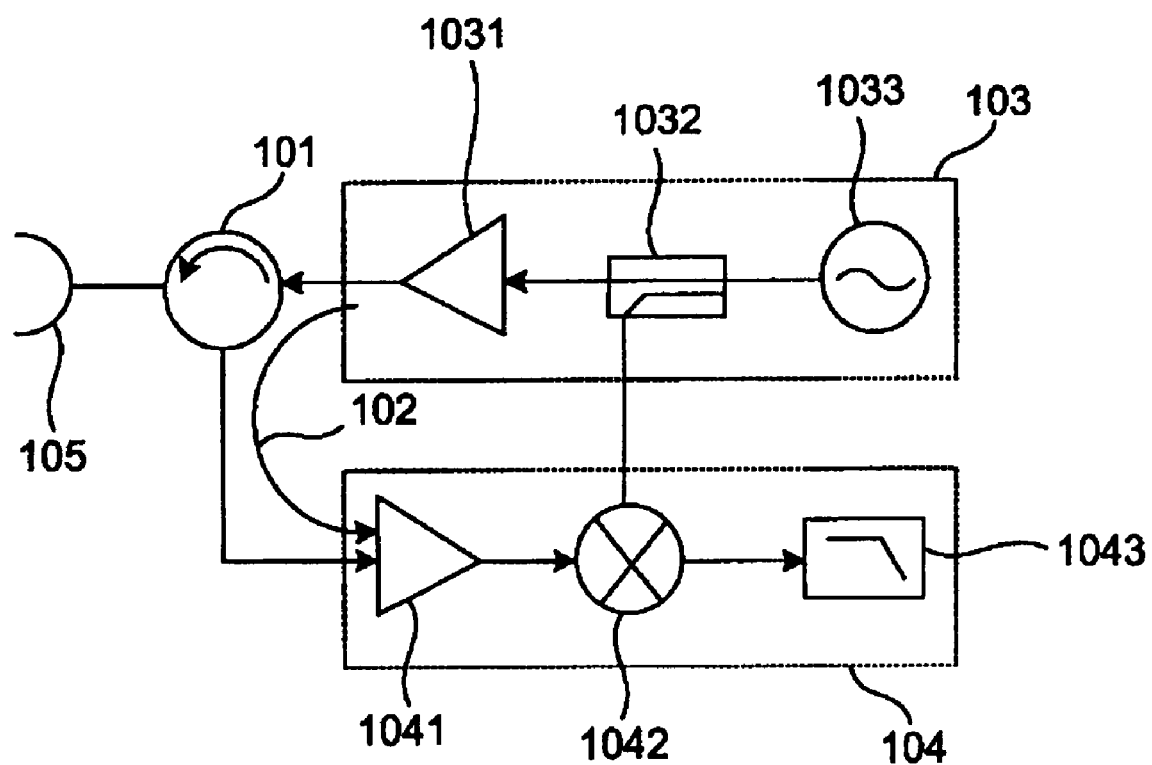
FIG. 1 is a schematic diagram illustrating a conventional radar transmission/reception end using a single antenna.
Figure 2:
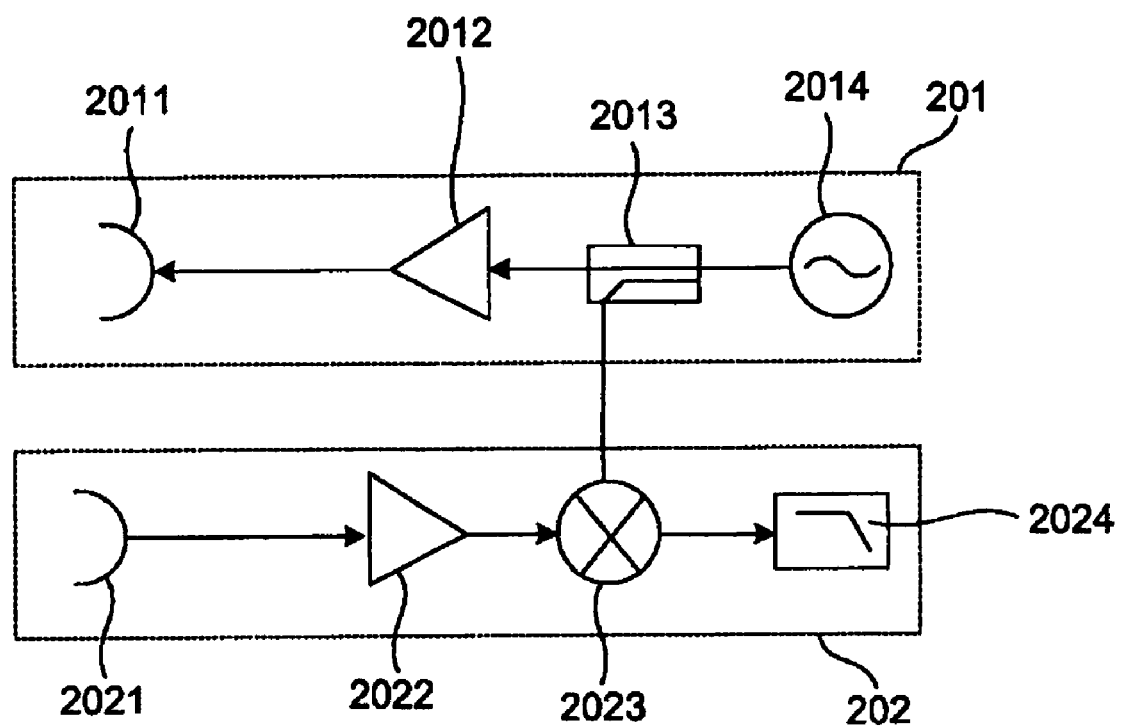
FIG. 2 is a schematic diagram illustrating a conventional radar structure for applying two antennas to transmission/reception ends, respectively.

Now, preferred embodiments of the present invention will be described in detail with reference to the annexed drawings. In the drawings, the same or similar elements are denoted by the same reference numerals even though they are depicted in different drawings. In the following description, a detailed description of known functions and configurations incorporated herein will be omitted when it may make the subject matter of the present invention rather unclear.

It should be noted that most terminology disclosed in the present invention is defined in consideration of functions of the present invention, and can be differently determined according to intention of those skilled in the art or usual practices. Therefore, it is preferable that the above-mentioned terminology be understood on the basis of all contents disclosed in the present invention. Other implementations are within the scope of the following claims. The details of one or more implementations are set forth in the accompanying drawings and the description below. Other features will be apparent from the description and drawings, and from the claims. It should be noted that the scope of the present invention can be applied to not only the distance measurement and the speed measurement.

Figure 4:
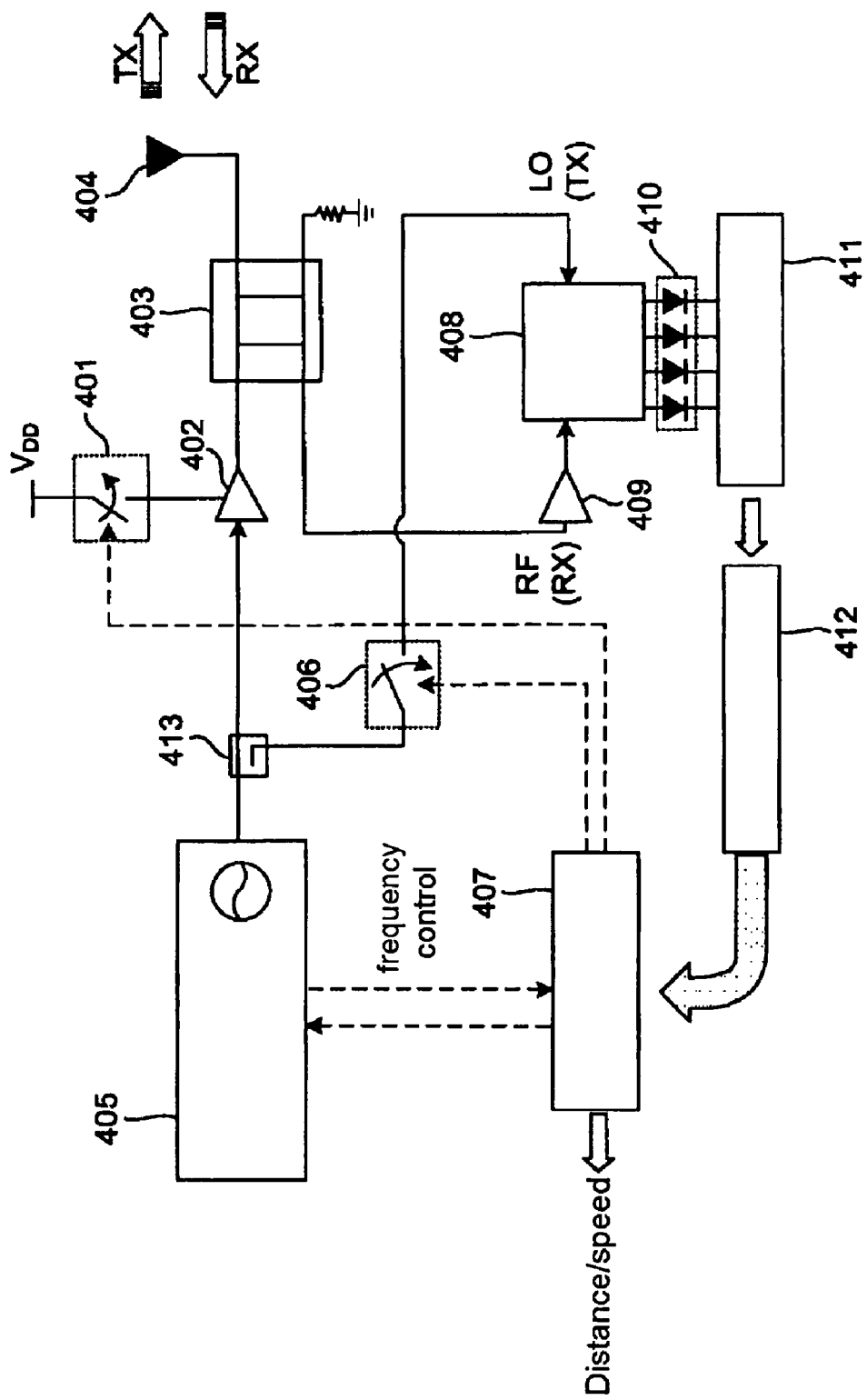
FIG. 4 is a block diagram illustrating a distance measurement sensor according to a preferred embodiment of the present invention.

FIG. 4 is a block diagram illustrating a distance measurement sensor according to a preferred embodiment of the present invention.

Referring to FIG. 4, a frequency-controllable oscillator 405 generates a stable high-frequency signal, controls the high-frequency signal at a desired frequency, and transmits the resultant signal.

The above-mentioned frequency control process is performed by the CPU (Central Processing Unit) 407. The CPU 407 controls not only the above-mentioned frequency control but also a first switch 401 and a second switch 406.

The first switch 401 is designed to power on or off the power amplifier 401 capable of amplifying the high-frequency signal.

The second switch controls the reference signal (L0). The reference signal (L0) is generated from the coupler 413, and is then applied to the L0 terminal from among the two input ports of the 6-port circuit 408.

The high-frequency transmission/reception signal is transmitted or received over the antenna 404. In order to separate the transmission signal and the reception signal from each other and receive the separated signals, the directional coupler 402 is located between the power amplifier 402 and the antenna 404.

Figure 3:
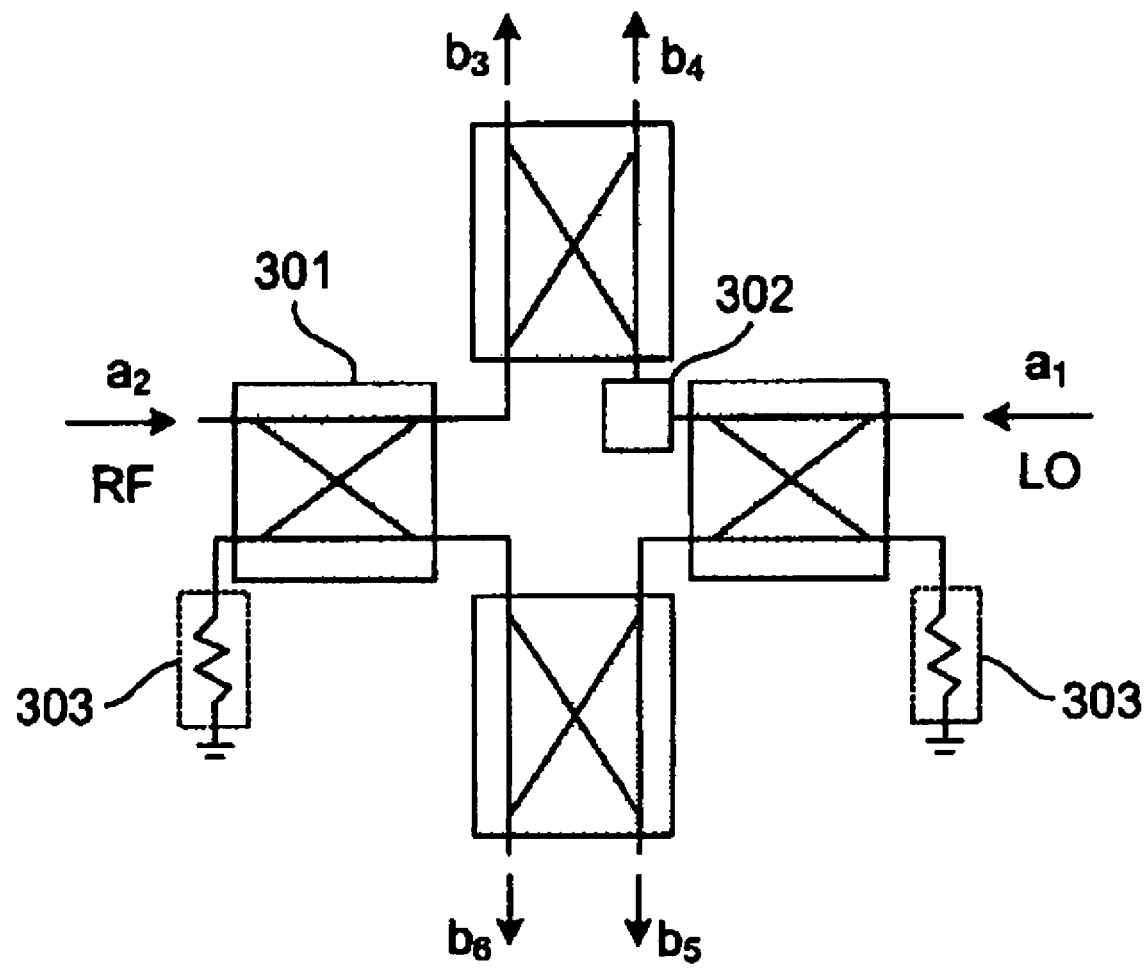
FIG. 3 is a circuit diagram illustrating a 6-port structure denoted by passive elements.

The RF signal received via the antenna 404 is separated by the directional coupler 403, is amplified by the low-noise amplifier 409, and is then applied to the RF unit of the 6-port circuit 408. In this case, the 6-port circuit 408 is equal to that of FIG. 3.

Four high-frequency signal powers divided by the 6-port circuit 408 are converted into DC voltage signals by the high-frequency power detector 410. The magnitude of the converted voltage signal can be effectively acquired by the signal processor 411 via the low-noise amplification and the non-linear amplification.

The amplification signal generated from the signal processor 411 is converted into a digital signal by an ADC (analog-to-digital converter) 412. Speed- and distance-information of the information transmitted from the ADC 412 are calculated by a specific algorithm pre-stored in the CPU 407 in real time, and the calculated result is displayed in real time.

As described above, the 6-port circuit 408 can recognize the distance (or speed) on the basis of a phase difference between the reference signal (L0) and the reception signal (RF), such that it may also be referred to as a six-port phase/frequency discriminator as necessary.

The first switch 401 and the second switch 402 are required for the pulse operation. If the first switch 401 and the second switch 402 are switched on, the distance measurement sensor transmits/receives the CW signal in the same manner as in the conventional distance measurement sensor based on the 6 ports, such that it acquires distance information. This operation can be executed under the condition that the distance to be measured is short.

If the distance to be measured becomes longer, the magnitude of the reception signal is lowered. In order to detect the magnitude of the reception signal, the reception signal must be amplified to have a recognizable signal level.

The transmission signal is partially received in the reception end via the transmission/reception separator. If the distance to be measured becomes longer, the magnitude of the reception signal is lowered, such that the reception signal may be shorter than the transmission leakage signal.

In this case, if the amplifying action of a high gain is performed to acquire a low-level reception signal, the transmission leakage signal is also amplified at a high gain, such that the signal detection end of the reception end is saturated. Therefore, the longer the distance to be measured, the larger the leakage signal's influence between the transmission end and the reception end. As a result, the conventional CW-based method has a considerably-limited measurement distance.

Since the separator for separating the transmission end and the reception end from each other has poor characteristics, the transmission leakage signal occurs. The circulator or the isolator widely used for a wireless communication system such as a mobile communication system has unique characteristics of about −20 dB. In this case, the circuit for removing the transmission leakage signal may be used to remove the poor characteristics of the isolator and the circulator using the coupler's phase, however, it should be noted that it cannot acquire the separation characteristics of −40 dB or more.

Therefore, the improving of the separation characteristics on the basis of the circuit configuration increases the size of an overall sensor, and has the limited characteristics. The transmission leakage signal is generated when the transmission signal is transmitted via the power amplifier. Therefore, the sensor is not operated at the time at which the transmission leakage signal occurs, such that the influence of the transmission leakage signal can be greatly reduced.

The distance measurement sensor based on the CW-based 6-port circuit can acquire the distance information only when two high-frequency signals (i.e., the reference signal L0 and the reception signal RF) simultaneously exist. Operations of the distance measurement sensor can be controlled by the reference signal.

There is a difference in time during a specific time from the beginning time to the reflection/arrival time of the high-frequency signal. Therefore, during the transmission time, the signal used as the reference signal is powered off to prevent the result of the leakage signal from being generated. During the reception time, the reference signal is applied and the power amplifier is powered off, such that desired distance information is acquired.

Figure 5:
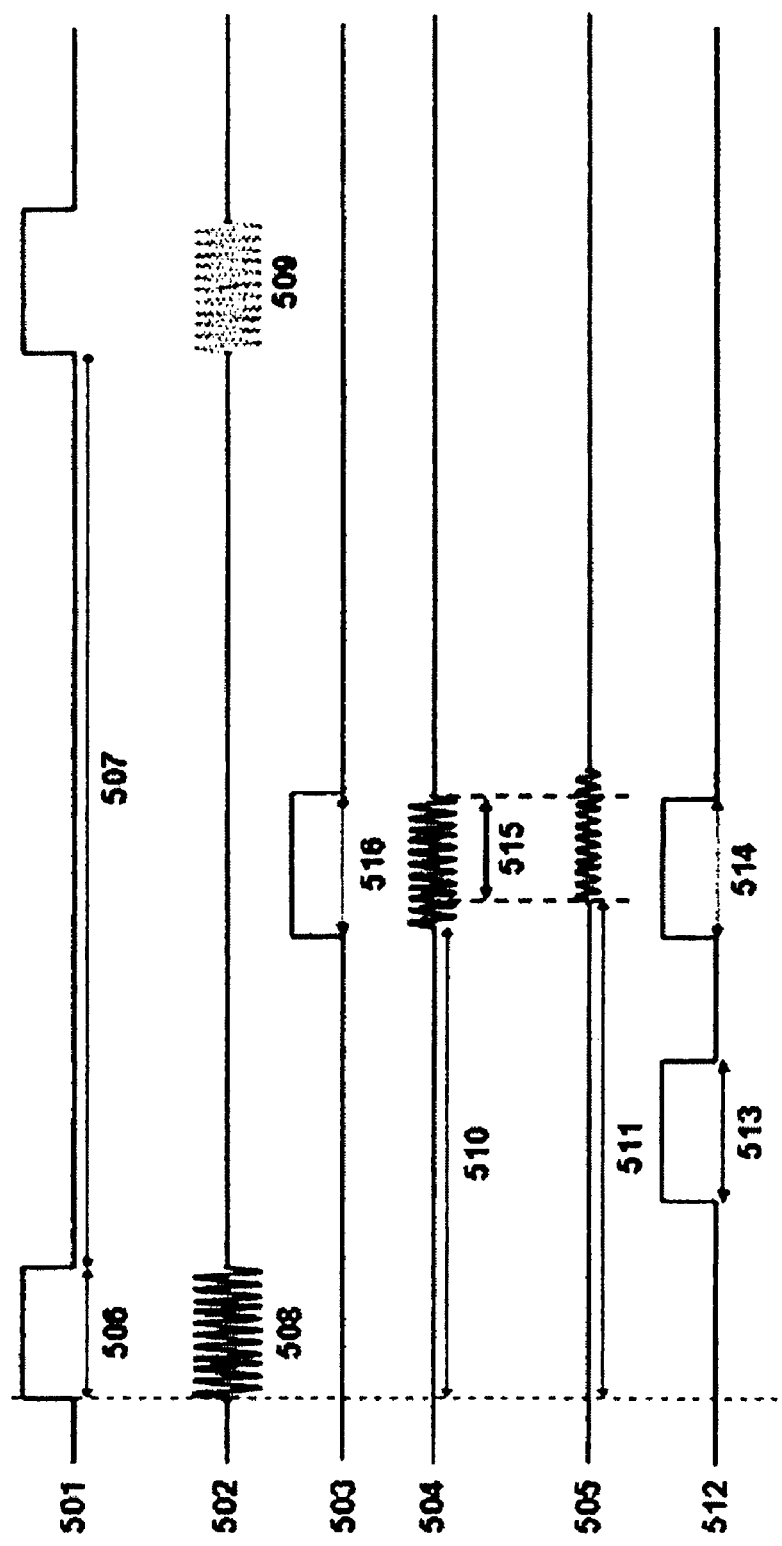
FIG. 5 is a graph illustrating temporal variation of a clock signal and a transmission/reception signal associated with the clock signal according to the present invention.
Figure 6:
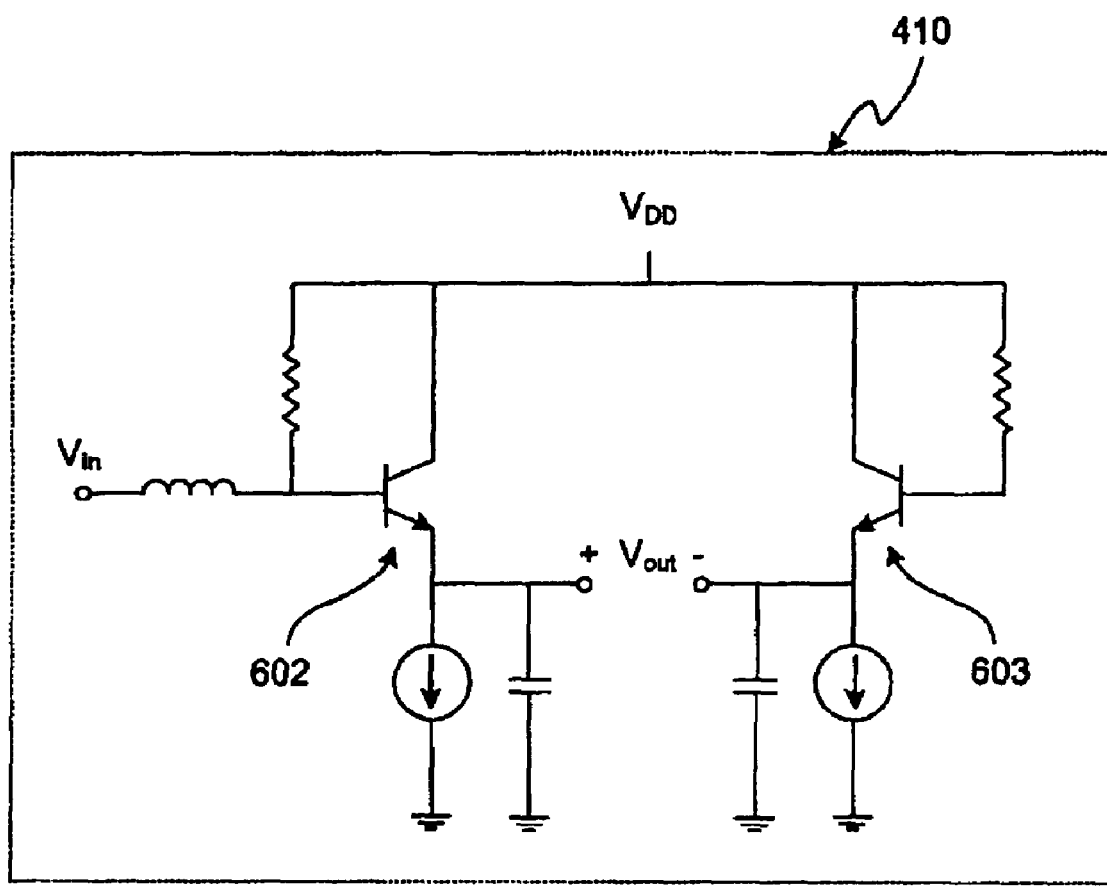
FIG. 6 is a circuit diagram illustrating a high-frequency power detector for use in the sensor of FIG. 4 according to the present invention.

The above-mentioned operation can be easily recognized by the user who views the time-variant signal of FIG. 5.

If the sensor of FIG. 4 is operated under the pulse mode, FIG. 5 shows the graph illustrating the temporal variation of the clock signal and the transmission/reception signals associated with the clock signal.

FIG. 5 is a graph illustrating temporal variation of a clock signal and a transmission/reception signal associated with the clock signal according to the present invention.

Referring to FIG. 5, the reference number 501 is indicative of a first clock signal applied to the first switch 401, such that it can control the power amplifier 402.

The reference number 506 contained in the first clock signal 501 is indicative of a specific time during which the first switch 401 is switched on to operate the power amplifier 402.

The reference number 507 is indicative of a specific time during which the first switch 401 is switched off so that the power amplifier 402 is not operated. During this specific time 507, an amount of power consumption of the sensor can be reduced.

The reference number 502 is a graph illustrating a time-variant graph of the high-frequency signal transmitted via the antenna 404.

The graph of FIG. 5 shows a phase-difference comparison method for transmitting/receiving different frequency high-frequency signals using the sensor of the present invention, such that the distance measurement can be performed by the phase-difference comparison result.

The reference number 508 is indicative of a first high-frequency signal, which is amplified by the power amplifier 402 is then transmitted via the antenna 404.

The reference number 509 is indicative of a second high-frequency signal having another frequency generated from the frequency-controllable oscillator 405 at the next period. If phase-difference results based on the two frequencies are compared with each other, the distance measurement can be executed by the inventive sensor.

In the meantime, the reference number 503 is indicative of a second clock signal applied to the second switch 406 for controlling the reference signal (L0) to detect the reception signal reflected from the target object to be measured.

The reference number 510 contained in the high-frequency signal 504, which is received as the reference signal of the 6-port circuit 408 by the second clock signal 503, is indicative of a specific time during which the reference signal is not connected before receiving the reception signal. In this case, the transmission leakage signal has no influence on the output signal of the sensor.

The reference number 505 is indicative of a specific signal received in the sensor after being reflected from the target object. It can be recognized that a delay time 511 occurs due to the distance to the target object.

In order to implement the distance measurement action, the overlapping time 515 between the reception signal 505 and the reference signal (L0) must exist.

In the meantime, if the sensor desires to measure several objects, the signal for operating the second switch 406 may be added as a clock signal for switching on the signal in the same manner as in the third clock signal 512 instead of the second clock signal 503.

Since the above-mentioned reference numbers of FIG. 5 have been disclosed as described above, a method for measuring the distance using the inventive sensor according to the present invention will hereinafter be described with reference to FIGS. 4 and 5.

In order to operate the sensor of FIG. 4 under the pulse mode, the first and second switches 401 and 406 must be operated along with the first and second clock signals 501 and 503 of FIG. 5.

If the sensor is operated under the pulse mode, the first clock signal is applied to the first switch 401. While the first clock signal 501 is switched on, the power amplifier 402 is operated, and the high-frequency signal is amplified by the power amplifier 402 and is transmitted to the target object via the antenna 404.

During the above-mentioned time during which the first clock signal 501 is switched on, the second switch 406 receives the second clock signal 503, such that it is powered off. In the ideal case, there is no reference signal L0 transmitted as an input signal of the 6-port circuit 408.

Therefore, although the transmission leakage signal is applied to the reception end, there is no reference signal, so that no output signal of the 6-port circuit 408 occurs or the output signal of the 6-port circuit 408 is useless, and the influence of the transmission leakage signal is removed.

If the reception signal reflected from the target object has the delay time 511, the signal 505 may be received in the RF unit of the 6-port circuit 408. In this case, if the reference signal is applied via the second switch 406, and the signal 504 may enter the L0 terminal of the 6-port circuit 408, the phase difference between the reference signal and the reception signal may be recognized by the 6-port circuit 408, such that the user can acquire desired distance information.

If the distance measurement sensor receives the above-mentioned information, two high-frequency signals must enter the input terminal of the 6-port circuit 408. Therefore, the delay time 510 required for driving the second switch 406, the time 506 required for driving the first switch 401, and the delay time 511 required for receiving the reception signal can have the relationship denoted by the following equation 1:

$$0 < t_{(511)} < t_{(510)} < t_{(506)} \qquad \text{[Equation 1]}$$

Also, the time 515 required for simultaneously applying the reference signal and the reception signal to the input terminal of the 6-port circuit 408 must exist.

In Equation 1, "$t_{(511)}$" is indicative of a delay time of the distance between a reception signal, which is reflected from the target object and is then received in the sensor, and the target object to be measured. "$t_{(510)}$" is indicative of a delay time required for driving the second switch 406. "$t_{(506)}$" is indicative of a specific time during which the first switch 401 is switched on to operate the power amplifier 402.

Within the range of a short distance, the transmission signal is quickly received in the sensor, such that this method is equal to the conventional CW method. Therefore, the sensor's operation can be represented by the following equation 2:

$$t_{(511)} - t_{(506)} > 0 \text{ [Pulse mode]}$$

$$t_{(511)} - t_{(506)} < 0 \text{ [CW mode]} \qquad \text{[Equation 2]}$$

In this way, the operation of the sensor can be divided into several sections in a time domain.

The transmission leakage signal causes a representative DC offset generated by the sensor structure. Not only the DC offset generated by the sensor structure but also another DC offset caused by the circuit itself exists. In order to minimize the second DC offset, two transistors 602 and 603 configured in the form of a differential circuit are used as the high-frequency power detector 410.

The above-mentioned power detector performs the same operation as that of the conventional power detector because it detects the power using the one-side diode matching.

However, the DC offset voltage generated in a one transistor when the high-frequency signal is converted into the DC voltage is equally generated in the other transistor unconcerned with the power detection. Provided that the difference between the DC offset voltage of the first transistor and the DC offset voltage of the second transistor, the DC offset voltage obtained by the high-frequency power detector can be ideally removed.

If the pulse mode is provided, the distance measurement sensor based on the 6-port circuit according to the present invention may define the range of the distance to be measured, or may check information of several target objects to be measured. The information of the distance to be measured is determined by the time, during which the signal is reflected from the target object and returns to the sensor. Therefore, the range of the measurement distance is determined by the setup of the above-mentioned time range.

If the signal 503 of FIG. 5 is applied to the reference signal, the distance acquired from the output signal can be acquired from the object having a delay time capable of satisfying the following equation 3:

$$t_{(510)} < t_{(511)} < t_{(510)} + t_{(516)}$$ [Equation 3]

The distance range is determined by the $t_{(516)}$ value, so that a desired distance range is determined according to the value of $t_{(516)}$. For example, if a first object is located at the distance of 3 meters and a second object is located at the distance of 5 meters, a delay time measured at the first object located at the distance of 3 m is 20 ns, and a delay time measured at the second object located at the distance of 5 m is 33 ns.

In order to acquire the accurate distance information from the second object located at the distance of 5 m, the sensor sets the $t_{(510)}$ value to 30 ns, and sets the $t_{(516)}$ value to 5 ns. In this case, the information capable of being acquired by the sensor is associated with the object for generating the delay time of 30 ns~35 ns, such that the distance information of the object located at the distance of 3 m does not appear.

If two objects adjacent to each other exist, and the $t_{(516)}$ time for determining the distance range is set to a lower value, the two objects can be distinguished from each other.

However, the $t_{(516)}$ time of the sensor according to the present invention establishes only the distance range, and the actual distance measurement is acquired by a difference in phase between the transmission frequency and the reception frequency, whereas the conventional pulse method determines the distance accuracy according to the time for determining the distance range. As a result, the accuracy of the distance measurement according to the present invention is superior to the above-mentioned conventional pulse method.

If the clock signal 512 of FIG. 5 is applied to the second switch 406, the time (513 and 514) during which the reference signal is switched on two times, such that the distance information can be acquired two times. Therefore, two objects can be distinguished from each other on the basis of the acquired distance information, and each distance information can also be acquired with the high accuracy. The above-mentioned operation is indicative of the most important principle widely applied to an actual application case including several objects. In other words, the distance measurement sensor according to the present invention can expect the higher accuracy of the acquired distance information, so that it is superior to the conventional distance measurement sensor.

As apparent from the above description, the present invention drives the CW-based distance measurement sensor under the pulse mode, such that it can acquire more accurate distance information at a remote site. The present invention can freely control the power amplifier acting as the power consumption element of the sensor, such that an amount of power consumption required for the sensor is reduced, such that the distance measurement sensor can be applied to a variety of application fields (e.g., a portable system or a Ubiquitous system).

If the distance measurement sensor is operated under the pulse mode, the detection time of the reception signal has a difference in time according to objects, so that several objects to be measured are separated so that the signal can be detected from each of the objects. Similar to this operation, if a user desires to recognize only the object located at a specific distance, the present invention can establish a time range, and can measure the distance according to the established time range. If this operation is introduced to a radar image sensor, the radar image sensor can check image information of a specific object located at a specific distance, so that it can be extended to many more application fields.

The radar sensor for measuring the distance using the general pulse signal checks a start time at which the transmission signal is transmitted, checks an arrival time of the reception signal, and detects a difference between the start time and the arrival time, so that it recognizes the distance on the basis of the detected difference.

In this case, if two objects are very close to each other, there is no difference in time, or the signal is detected within the sensor's response speed, so that it is impossible to measure the distance between the two objects.

Since the present invention is based on the CW method, it can measure the distance simultaneously while maintaining the high accuracy although the two objects are very close to each other. The method for recognizing the distance according to the present invention is based on the CW-based phase comparison irrespective of the mode, so that the present invention has the high accuracy of data as compared to the method for measuring the difference in time.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A distance measurement sensor comprising:
   a frequency-controllable oscillator for generating a reference signal and a transmission signal transmitted to a target object to be measured;
   an antenna for transmitting the generated signal and receiving the reception signal reflected from the target object to be measured;
   a power amplifier for amplifying the transmission signal;
   a low-noise amplifier for amplifying the reception signal;
   a first switch for controlling the power amplifier;
   a 6-port circuit for receiving the reference signal and the reception signal as its input signals, detecting a phase difference between the reference signal and the reception signal, and being able to obtain distance information denoted by power of a high-frequency signal on the basis of the detected phase difference;
   a second switch located between the frequency-controllable oscillator and the 6-port circuit, for controlling the reference signal;
   a high-frequency power detector for converting the high-frequency signal power into a DC voltage in four outputs of the 6 port circuit;

an Analog-to-Digital Converter (ADC) for converting the DC voltage obtained by the high-frequency power detector into data capable of being calculated; and a Central Processing Unit (CPU) for controlling the frequency of the signal generated from the frequency-controllable oscillator and the first and second switches, calculating the output data of the ADC using an algorithm stored in the CPU itself as distance data, and displaying the distance data.

2. The distance measurement sensor according to claim 1, wherein the antenna is commonly used to transmit the generated signal and to receive the reception signal, and an input terminal of the antenna is connected to a directional coupler for separately receiving the transmission signal and the reception signal.

3. The distance measurement sensor according to claim 1, wherein the high-frequency power detector is configured in the form of a differential circuit equipped with 2 transistors, such that it can remove a DC offset voltage.

4. A method for measuring a distance using the distance measurement sensor of claim 1 comprising:
transmitting/receiving a CW (Continuous Wave) signal during a specific time, comparing a phase of the transmission signal with that of the reception signal, and measuring the distance according to the result of the comparison.

5. A method for measuring a distance using the distance measurement sensor of claim 1 comprising:
controlling a supply power of the power amplifier using the first switch, controlling a reference signal applied to an input terminal of the 6-port circuit using the second switch, and implementing a pulse mode.

6. The method according to claim 5, wherein the distance measurement sensor has different operation modes according to measurement distances.

7. The method according to claim 6, wherein:
the sensor is operated under a CW mode for continuously transmitting/receiving a continuous wave (CW) signal within a short distance for satisfying an equation "$t_{(511)} - t_{(506)} < 0$"; and
the sensor is operated under a pulse mode for transmitting/receiving a continuous wave (CW) signal during only a specific time at a remote distance for satisfying an equation "$t_{(511)} - t_{(506)} > 0$";
wherein $t_{(511)}$ is indicative of a delay time of the distance between a reception signal, which is reflected from the target object and is then received in the sensor, and the target object to be measured, and $t_{(506)}$ is indicative of a time during which the first switch is switched on to operate the power amplifier.

8. The method according to claim 5, wherein:
a switching ON time of the second switch is controlled so as to apply the reference signal to an input terminal of the 6-port circuit only for a predetermined time, and it results that the range of the distance of the object to be measured is determined according to the predetermined reference signal application time and only the signals reflected from the object within the range are detected.

9. The method according to claim 5, wherein the transmission/reception signals are controlled to distinguish several objects in real time, such that each signal is detected.

* * * * *